March 8, 1966 J. H. SNELL, JR 3,239,631
LIGHTNING ARRESTER SEPARATOR
Filed Sept. 29, 1964 2 Sheets-Sheet 1
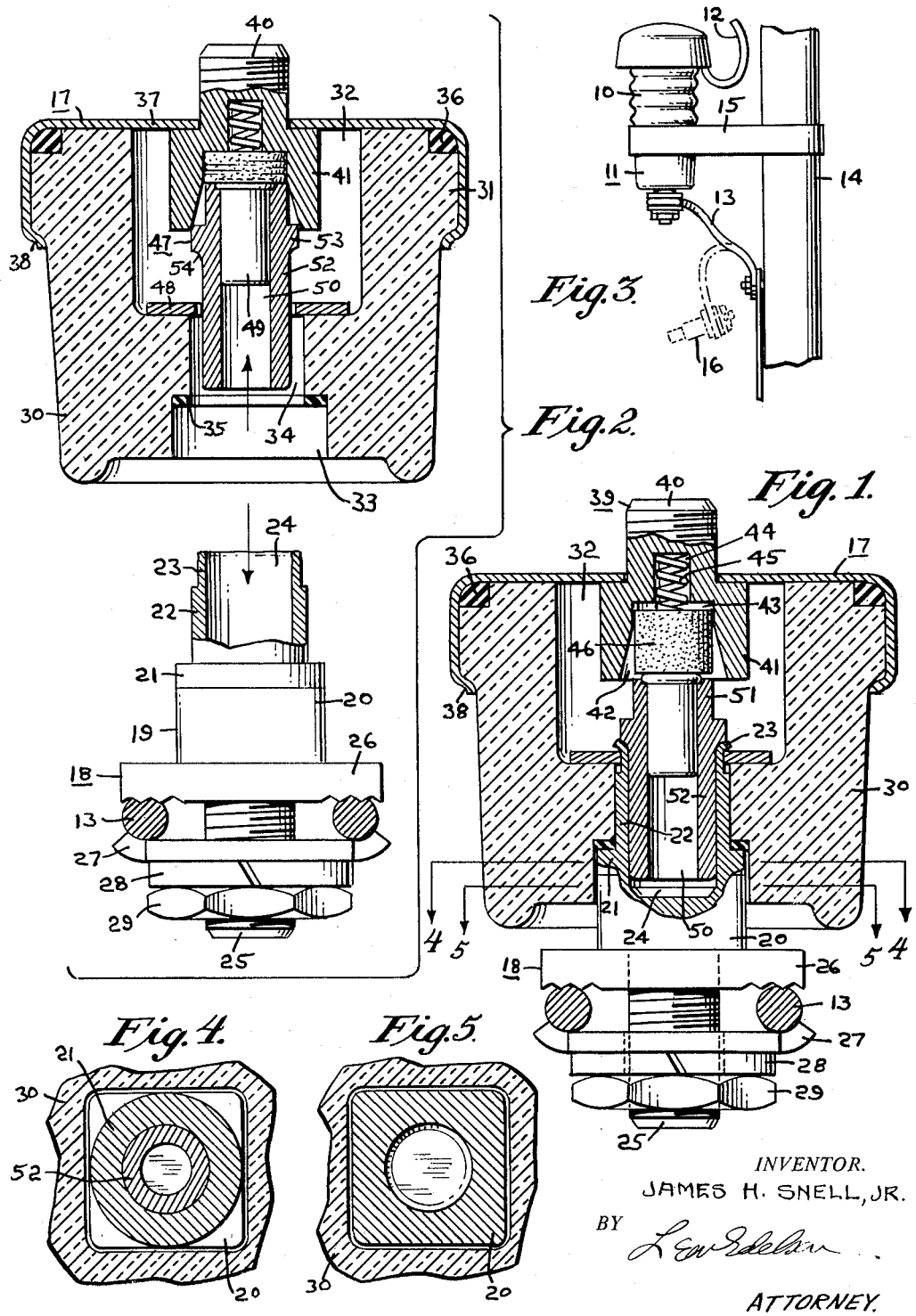
INVENTOR.
JAMES H. SNELL, JR.
BY
ATTORNEY.

March 8, 1966   J. H. SNELL, JR   3,239,631
LIGHTNING ARRESTER SEPARATOR
Filed Sept. 29, 1964   2 Sheets-Sheet 2

INVENTOR.
JAMES H. SNELL, JR.
BY
L. Edelson
ATTORNEY.

3,239,631
Patented Mar. 8, 1966

3,239,631
LIGHTNING ARRESTER SEPARATOR
James H. Snell, Jr., Lynchburg, Va., assignor to H. K. Porter Company, Inc., Lynchburg, Va., a corporation of Delaware
Filed Sept. 29, 1964, Ser. No. 399,970
8 Claims. (Cl. 200—115)

This invention relates generally to lightning arrester devices, and more particularly relates to a lightning arrester of unique construction which includes explosive means effective to break the conduction path through the lightning arrester under conditions where continuous current flow across the arc gap of the arrester occurs under normal operating conditions, that is, after a lightning stroke surge current has ceased.

Lightning arresters are connected to power lines to carry electrical surge currents to ground and avoid damage to the lines, as for example when the power lines are struck by lightning. All lightning arresters include electrical series elements having a high resistance to the voltages normally encountered on the power line but offering very low resistance to surge currents produced by sudden extremely high voltage conditions usually encountered under lightning strike conditions. The lightning arrester normally returns to a high resistance condition which interrupts the flow of current to ground when the voltages on the power line return to a value below the breakdown or surge current potential.

Occasionally, lightning arresters fail by continuing to electrically connect the power line to ground after cessation of the over-voltage condition which caused the surge current flow, in effect thereby establishing a line short circuit condition or a very high leakage current condition. Generally, the power line will eventually go out of service due to operation of line circuit breakers or failure of distribution transformers. The power line will of course remain out of service until the defective lightning arrester has been located and disconnected therefrom.

In the past, lightning arresters have been devised which disconnect themselves from the line by causing an explosive charge to explode under the previously described malfunction conditions of the lightning arrester, the explosion effecting the disconnection of the lightning arrester from the line providing visual evidence of such occurrence which is observable from ground level. Some such explosive devices throw off parts at high velocity due to the nature of the explosion with the attendant possibility of injury to persons in the vicinity. Other constructions have used electrical resistance elements in the separator structure which were required to have very special and not readily controlled resistance characteristics in order to prevent resistor failure due to ordinary impulse currents on the power line while allowing persistent follow current to flow therethrough. Further, some prior constructions of lightning arrester separator are not always reliable in that occasionally the explosive force generated by the separator is insufficient to effect disconnection of the lightning arrester from the power line. Accordingly, it is a primary object of my invention to provide a novel lightning arrester separator device utilizing an explosive charge effective to disconnect the lightning arrester from its associated power line by physically breaking the electrical circuit from the power line to ground through the lightning arrester device.

Another object of my invention is to provide a novel lightning arrester separator device as aforesaid utilizing relatively few parts in a novel mechanical arrangement effective to produce high separation force on the separable parts of the separator, effecting separation of the device without fragmentation and thereby eliminating projectile danger.

Still another object of my invention is to provide a novel lightning arrester separator device as aforesaid which includes parallel electrical conduction paths therethrough, one path being through a resistive element effective to dissipate the energy of normal leakage current and prevent radio interference generation, while the other path is provided by an arc-gap designed to break down under over voltage surge conditions to conduct lightning strokes to ground from the power line when the lightning arrester itself passes such a surge.

The foregoing and other objects of the invention will become clear from a reading of the following specification in conjunction with an examination of the appended drawings, wherein.

FIGURE 1 is a vertical central sectional view through the lightning arrester separator device with some portions being shown in elevation;

FIGURE 2 is similar to FIGURE 1 but shows the parts of the separator moved apart in the manner resulting from explosive operation of the separator to effect separation of the associated lightning arrester from the grounding circuit;

FIGURE 3 is a side elevational view of a lightning arrester having the novel separator coupled thereto at the bottom thereof with the entire structure shown intact in solid line, and with detachment of the lightning arrester from the ground line illustrated by the disconnected phantom line showing of the bottom portion of the separator structure;

FIGURE 4 is a horizontal cross sectional view through the separable lower portion of the separator device as will be seen when viewed along the line 4—4 of FIGURE 1;

FIGURE 5 is a horizontal cross sectional view through the lower separable portion of the separator device as would be seen when viewed along the line 5—5 of FIGURE 1.

In the several figures, like elements are denoted by like reference characters.

Figure 6:
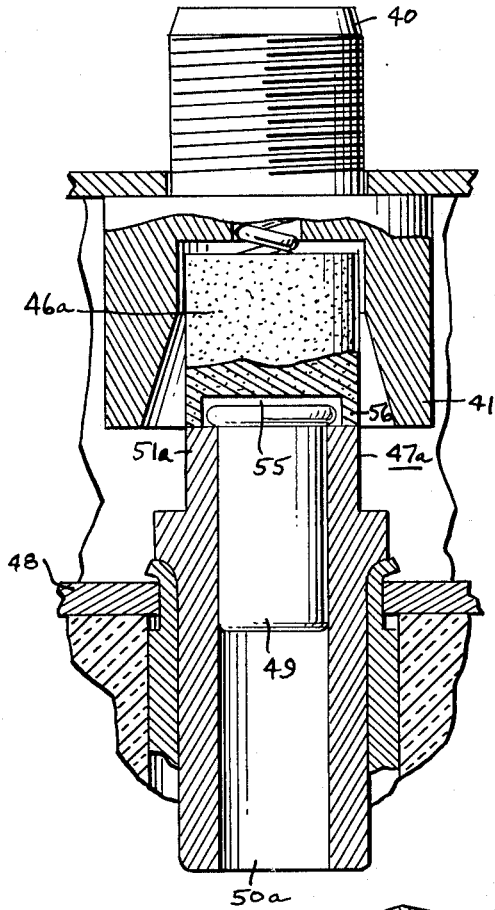
FIGURES 6, 7 and 8 are enlarged fragmentary portions of modified forms of the separator device according to the invention.

Referring now to the drawings, attention should be first directed to the showings of FIGURES 1 through 5, FIGURE 3 illustrating the general environment in which the separator device is utilized, while FIGURES 1, 2, 4 and 5 illustrate details of the separator structure itself. In FIGURE 3 there is observed a lightning arrester designated as 10, to the lower end of which is secured the separator 11 and to the upper end of which is electrically connected a conductor 12 which is in turn connected to the power line to be protected. The lower end of the separator 11 is connected via a conductor 13 to a ground line carried by a supporting pole 14 which also physically mounts the lightning arrester and separator by means of a bracket 15. The solid line showing of FIGURE 3 illustrates the device in its use condition while the phantom line showing designated as 16 illustrates the lower portion of the separator 11 physically separated from the upper portion of the separator and ejected from the latter as occurs when the separator structure has been activated to disconnect the lightning arrester from the grounding circuit. The manner of effecting the disconnect will become clear from an examination of FIGURES 1, 2, 4 and 5 to which reference should be now made.

The separator 11 is formed from an upper assembly designated generally as 17 and a lower assembly designated generally as 18, the lower assembly 18 being that which is ejected from the upper assembly 17 when the separator device is actuated, while the upper assembly 17 is mechanically and electrically connected to the lower end of the lightning arrester 10. The lower assembly 18 includes as its principal part a metal stud 19 having a central region 20 of square horizontal cross section surmounted by a cylindrical section 21 of shorter vertical extent and of diameter substantially equal to the side length of the square cross section central region. Extending upward axially from the cylindrical section 21 is the second cylindrical section 22 of smaller diameter but of greater axial extent, the upper end of the cylindrical section 22 being itself of further reduced diameter as shown at 23.

The upper end of the stud 19 is axially bored as at 24 endwise inward through the cylindrical sections 23, 22 and 21 and downward into the upper end of the square cross section central region 20. The axial bore 24 is of such diameter that the reduced diameter upper terminal end of the cylindrical section 22 is provided with a wall thickness thin enough to be outwardly flared in the fashion of a rivet so that the cylindrical end section 23, as will be seen, is capable of and in fact functions as a rivet end. Extending downward from the central region 20 of the stud 19 is an externally threaded shank 25. Disposed upon the threaded shank 25 is a wire clamping assembly consisting of wire clamping nut 26, wire clamp 27, lock-washer 28 and hex jam nut 29. As shown in FIGURES 1 and 2, the end of ground wire conductor 13 shown in FIGURE 3 is clamped between wire clamping nut 26 and wire clamp 27 by pressure brought to bear on the latter through lock-washer 28 and jam nut 29.

The upper assembly 17 is formed principally by the molded body 30 of electrical insulation material which is generally cylindrical form and provided with an outwardly extending annular projection 31 extending peripherally thereabout proximate to but spaced somewhat down from the upper end thereof. The molded body 30 is formed with a cylindrical well 32 extending downward axially from the body upper surface, and with a bottom recess 33 extending axially upward from the bottom of the molded body 30 and formed in cross section complementally to the cylindrical section 21 and central region 20 of the stud 19 so that the latter may be projected upward thereinto, as is for example seen in the showing of FIGURE 1. Joining the bottom end of the well 32 and the upper end of the bottom recess 33 is an axially extending cylindrical bore 34 of diameter sufficient to permit the cylindrical section 22 of the stud 19 to pass freely close fittingly upward therethrough in the manner also best seen in the showing of FIGURE 1. Disposed close fittingly about the stud cylindrical section 22 and seated upon the upper surface of the cylindrical section 21 is an annular rubber gasket 35 which seals the cylindrical well 32 at the bottom when the separator unit is assembled.

Seated upon the upper surface of the annular projection 31 of the body 30 is an annular rubber gasket 36 which seals the top end of the cylindrical well 32 when the cap 37 is seated downward upon the gasket 36 and has its lower edge 38 spun under the lower edge of the annular projection 31 when the separator unit is assembled. The cap 37 is provided with an axially extending combination stud and electrode member 39 having an externally threaded stud part 40 projecting above the upper surface of the cap 37 for threaded engagement into the bottom of the lightning arrester unit 10 and having a cylindrical electrode part 41 extending substantially half way down into the well 32. The outer diameter of the electrode 41 is greater than that of the stud part 40 but substantially less than the well diameter of the molded body 30 within which it is disposed.

The cylindrical electrode 41 is provided with a series of axially extending bores extending upward from the electrode under-surface toward and into the stud part 40, the bores being in order the conical bore 42 which reduces in cross section as it extends upward away from the under-surface of the electrode 41 and being then followed by the cylindrical bores 43 and 44. Disposed within the cylindrical bore 44 is a compression spring 45 the lower end of which presses against the upper surface of the cylindrical resistor 46 which is disposed within the conical and cylindrical bores 42 and 43 in the manner best seen in the showing of FIGURE 1.

The remaining parts of the separator device consist of the keeper 47, washer 48 and explosive cartridge 49. The keeper 47 is of generally cylindrical form having an axial bore 50 extending longitudinally completely therethrough from top to bottom and being of a diameter just equal to the casing diameter of the explosive cartridge 49 so that the latter is projectable close fittingly freely downward thereinto from the top, the upper end of the bore 50 being of somewhat enlarged diameter so that the enlarged head or firing pin end of the cartridge 49 is seatable half way down thereinto in the manner most clearly seen in the showing of FIGURE 1.

The upper end 51 of keeper 47 is of outside diameter slightly less than the diameter of cylindrical bore 43 of the cap electrode 41 while the lower end 52 of the keeper 47 is of outside diameter which enables it to be close fittingly freely projected downward into the bore 24 at the upper end of stud 19 of the lower assembly 18, in the illustrated case the upper end 51 and lower end 52 parts of the keeper 47 being equal. The keeper upper end 51 and lower end 52 are separated by a peripherally extending annular projection 53 of larger diameter than the keeper upper and lower ends but of somewhat smaller diameter than that of the open lower end of conical bore 42. The underside of the annular projection 53 is curved smoothly inward to merge with the lower end 52 of the keeper and form an anvil 54.

The separator device is assembled in the following manner. First, the rubber gasket 35 is slipped downward about the cylindrical section 22 of the lower assembly 18 which is then projected upward into bottom recess 33 of the body 30 with the cylindrical section 22 extending upward through the bore 34 so that the rivet end 23 projects into the well 32. The washer 48 is now dropped down into the well 32 from the open upper end so that it is disposed about the rivet end 23 of the stud 19. An assembly jig exerts axial pressure on the washer 48 and upward on the lower assembly 18, and while the parts are so held, the keeper 47 is projected downward into the open upper end of the stud 19 and is forced downward so that the anvil 54 expands the rivet end 23 outward over the upper surface of the washer 48. The rubber gasket 35 is thus captured under compression and provides a seal at the lower end of the assembly.

The explosive cartridge 49 is then deposited in the upper end of the keeper 47, and the cap assembly including the compression spring 45 and resistor 46 are positioned on the upper end of the body 30 with the lower end of the resistor 46 seated flatwise upon the upper face of the cartridge end. The cap assembly is now pressed downward to compress the rubber gasket 36, and the cap lower edge 38 is spun under as previously described to secure the cap in position and seal off the upper end of the well 32. The separator device is thus assembled in the manner shown in FIGURE 1.

In this arrangement it is observed that two possible electrical conduction paths are provided through the separator device from the upper stud 40 to the grounding conductor 13, one such path being through the stud 40, spring 45, resistor 46, head of cartridge 49 to keeper upper end at 51, and then through the body of the keeper to the stud 19 and conductor 13. The second conduction path is similar to the first but differs therefrom in that the resistor 46 is bypassed by the air gap which extends between the lower end of the cylindrical electrode 41 of the cap structure and the upper end 51 of the keeper 47. The resistor 46 is in fact provided to shunt the air gap between electrode 41 and keeper 47 to provide a path for normal leakage current which would otherwise cause radio interference under some conditions. Any surge current or power follow current, however, is carried by an arc across the air gap and bypasses the resistor 46.

If power line follow current persists after cessation of the surge current resulting from the very high potential of a lightning strike, the lightning arrester 10 is in fact inoperative and the continuous flow of current across the gap heats the edge of the keeper to such a temperature as to cause the cartridge 49 to fire. The gas generated by explosion of the cartridge 49 is trapped in the relatively small volume of the lower end of the axial bore 50 of the keeper 47. Before the full pressure of the evolved gas is developed, and before the head of the cartridge reaches the point of rupture, the keeper 47 moves upwardly out of the tubular end of the stud 19 and strikes the upper electrode 41 within the confines of the conical bore 42. Simultaneously, the resistor 46 is crushed into the bore 43 and solidly against the head of the cartridge and upper end of the keeper 47 so that no gas is permitted to escape from the upper end of the keeper bore.

Sealing of the upper end of the keeper occurs before the telescopic engagement between the keeper and ends 22 and 23 of the stud 19 is lost, and thus the evolved gas is trapped within a relatively small free volume and a higher peak gas pressure is developed than would be the case if the gas were allowed to occupy the entire free volume within the separator body of the cylindrical well 32. Since the keeper is unable to move upward, the gas pressure drives the stud 19 downward and rolls the rivet end 23 inward so that the stud 19 moves downward and separates from the washer 48. After additional downward motion the evolving gas is no longer trapped, but by this time since the securement to washer 48 has been broken the remaining gas pressure is sufficient to drive the stud 19 completely out of the body 30 to effect separation of the upper and lower assemblies of the separator device as shown in FIGURES 2 and 3.

Figure 7:
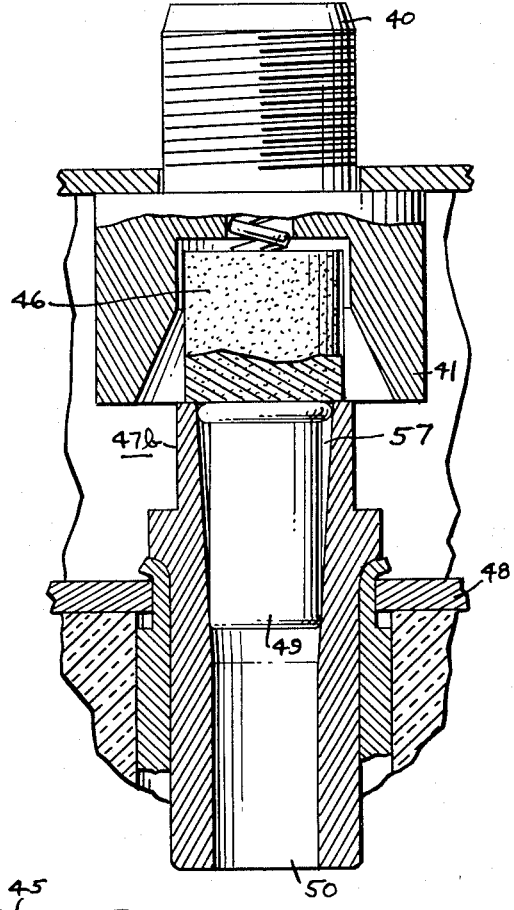
Figure 8:
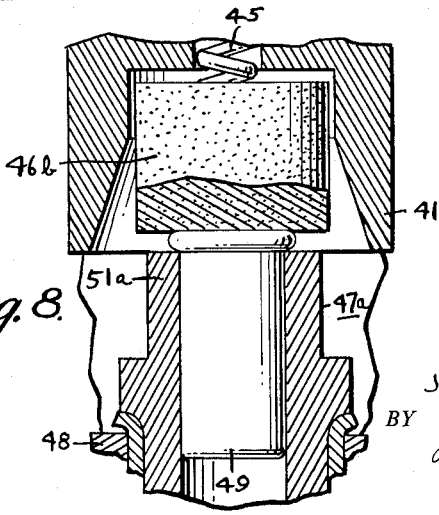

It should be noted in the showing of FIGURE 1 that the diameter of the resistor 46 whose undersurface is seated flush on top of the head of the cartridge 49 is deliberately made larger than the diameter of the cartridge head in order to prevent arc over from the cylindrical electrode 41 directly to the head of the cartridge 49 since such arc over could in some instances cause the cartridge to fire when in fact this is not desired. Shielding for the cartridge head is also provided by recessing the latter approximately half way down into the upper end of the keeper bore 50. FIGURES 6, 7 and 8 illustrate other forms of the invention in which shielding of the cartridge head from direct arc energy is achieved in alternate ways.

In the modification shown in FIGURE 6, the keeper 47a differs only from the previously described keeper 47 in that the upper end of keeper bore 50a is not enlarged in diameter so that the head of the cartridge 49 does not partially seat downward therewithin, but instead the head of the cartridge 49 is completely above the upper surface of the keeper upper end 51a. Additionally, the resistor 46a differs from the previously described cylindrical resistor 46 in that the lower end of resistor 46a is provided with an axial bore 55 which permits the annular resistor rim 56 to seat downward upon the upper surface of the keeper upper end 51a and thereby completely enclose the cartridge 49 so that arc energy is shielded from direct contact with the cartridge.

FIGURE 7 illustrates a somewhat different modification in which the upper end of bore 50 of keeper 47b is conically tapered as at 57 so that the head of the cartridge 49 is disposable downward completely within the keeper to thereby permit the undersurface of cylindrical resistor 46 to seat downward upon the top surface of the keeper and again completely shield the cartridge from arc energy. The modification of FIGURE 8 illustrates the same modified keeper 47a as is shown in FIGURE 6 but discloses the use of a cylindrical resistor 46b of larger diameter than the resistors 46 and 46a to provide a substantial overhang beyond the peripheral edge of the head of cartridge 49 so that the cartridge is again substantially shielded from direct arc energy. The embodiments illustrated in FIGURES 6, 7 and 8 are otherwise the same as that described in detail in connection with the showings of FIGURES 1 through 5, and the operation of the modified forms of separator is also the same as that already decsribed.

Having now described my invention in connection with particularly illustrated embodiments thereof, it will be apparent that variations and modifications of my invention may now occur from time to time to those persons normally skilled in the art without departing from the essential scope or spirit of the invention, and accordingly it is intended to claim the same broadly as well as specifically as indicated by the appended claims.

What is claimed to be new and useful is:

1. An electrical circuit interrupting device for series connection with a lightning arrester effective to permanently disconnect the lightning arrester from its grounding circuit in the presence of persistent power line follow current therethrough, comprising in combination, an insulating housing, spaced upper and lower electrodes mounted in a well within said housing and defining an air gap therebetween, said upper electrode being electrically connectable to the lightning arrester, said lower electrode having a passage extending vertically therethrough, an electrically conductive carrier member for said lower electrode, said carrier member having a vertically extending socket in which said lower electrode is closely fittingly disposed in vertically spaced coaxial alinement with said upper electrode and with its bottom end spaced from the bottom of said socket, said carrier member including means for electrically securing a ground line thereto, an explosive charge positioned within the passage of said lower electrode to close the top end thereof and provide a confined explosive chamber between said charge and the bottom of said socket, a resistor member disposed between said upper and lower electrodes and providing an electrical by-pass to said air gap therebetween at electrical potentials less than the arc-striking potential of said air gap, means sealing said housing well from the ambient atmosphere external to the circuit interrupting device, and means mechanically holding said carrier member to said housing, said explosive charge when detonated generating gas which expands in said chamber to generate sufficient pressure on the bottom end of said lower electrode to drive said electrode upward until the latter is stopped by engagement of the upper end of said lower electrode with the said upper electrode while said lower electrode is still partly disposed within the socket of said carrier member, said last-mentioned means being deformable under the pressure of the expanding gas confined within said chamber to release said carrier for ejection from said housing and thereby break the electrical connection between said lower electrode and said carrier member.

2. The circuit itnerrupting device as set forth in claim 1 wherein said explosive charge is in the form of a cartridge with the body thereof close fittingly disposed within the upper end of said lower electrode passage and with the head thereof at least partly extending above the upper end of said lower electrode, and wherein the lower surface of said resistor member is seated flatwise upon said cartridge head and extends laterally peripherally therebeyond to shield said cartridge head from air gap electric arc energy.

3. The circuit interrupting device as set forth in claim 1 wherein said explosive charge is in the form of a cartridge with the body thereof close fittingly disposed within the upper end of said lower electrode passage and with the head thereof at least partly extending above the upper end of said lower electrode, and wherein said resistor extends laterally peripherally beyond the edge of said cartridge head and is provided with a peripherally extending depending skirt which forms an enclosing chamber for said cartridge head, the lower edge of said skirt seating upon the upper end of said lower ectrode to thereby shield said cartridge head from air gap electric arc energy 4. An electrical circuit interrupting device for series connection with a lightning arrester effective to permanently disconnect the lightning arrester from its grounding circuit in the presence of persistent power line follow current therethrough, comprising in combination, an insulating housing, spaced upper and lower electrodes mounted in a well within said housing and defining an air gap therebetween, said upper electrode having a terminal projecting upward therefrom electrically connectable to the lightning arrester and being axially upwardly recessed from its bottom surface with an inwardly tapering frusto-conical bore, said lower electrode being of generally cylindrical shape having a passage extending axially vertically therethrough, an electrically conductive carrier for said lower electrode, said carrier having a vertically extending socket for snugly receiving said lower electrode and supporting the same in vertically spaced alignment with said upper electrode and with its bottom end spaced from the bottom of said socket, said carrier member including means for electrically securing a ground line thereto, an explosive charge positioned within the upper end of the vertical passage of said lower electrode to close the top end thereof and provide a confined explosive chamber between said charge and the bottom of said socket, a resistor member disposed within the conical bore of said upper electrode between said upper and lower electrodes and providing an electrical bypass to said air gap therebetween at electrical potentials less than the arc-striking potential of said air gap, gasket means sealing said housing well from the ambient atmosphere external to the circuit interrupting device, and means within said housing well detachably securing said carrier to said housing, said explosive charge when detonated generating gas which expands in said chamber to generate sufficient pressure on the bottom end of the said lower electrode to drive said electrode upward until the latter is stopped by engagament of the upper end of said lower electrode with the said upper electrode while said lower electrode is still partly disposed within the socket of said carrier, said last-mentioned means being deformable under the pressure of the expanding gas confined within said chamber to release said carrier for ejection from said housing and thereby break the electrical connection between said lower electrode and said carrier member.

5. An electrical circuit interrupting device as defined in claim 4 wherein the upper end of said carrier is fitted with an annular disc seated against the housing well bottom and is flared radially outward over said annular disc in mechanical contact therewith in the manner of a rivet to prevent premature downward movement of said carrier with respect to said housing, the flare of said carrier being deformable under the pressure exerted by the expanded gas in said explosive chamber to permit the aforesaid ejection of the carrier from the housing.

6. The circuit interrupting device as set forth in claim 4 wherein said explosive charge is in the form of a cartridge with the body thereof close fittingly disposed within the upper end of said lower electrode passage and with the head thereof at least partly seated within the upper end of said lower electrode, and wherein the lower surface of said resistor member is seated flatwise upon said cartridge head and extends peripherally therebeyond to shield said cartridge head from air gap electric arc energy.

7. The circuit interrupting device as set forth in claim 4 wherein said explosive charge is in the form of a cartridge with the body thereof close fittingly disposed within the upper end of said lower electrode passage and with the head thereof at least partly seated within the upper end of said lower electrode, and wherein said resistor extends peripherally beyond the edge of said cartridge head and is recessed to receive said cartridge head and shield it from air gap electric arc energy.

8. The circuit interrupting device as set forth in claim 6 wherein the upper portion of the passage through the lower electrode is upwardly and outwardly flared to snugly receive therein the said explosive cartridge with the head thereof disposed substantially flush with the top end of said lower electrode.

No references cited.

BERNARD A. GILHEANY, *Primary Examiner.*